United States Patent [19]
Torii et al.

[11] Patent Number: 5,216,342
[45] Date of Patent: Jun. 1, 1993

[54] SLIDING MODE CONTROL METHOD WITH A FEEDFORWARD COMPENSATION FUNCTION

[75] Inventors: Nobutoshi Torii, Hachioji; Ryo Nihei; Tetsuaki Kato, both of Yamanashi, all of Japan

[73] Assignee: Fanuc Ltd, Minamitsuru, Japan

[21] Appl. No.: 635,606

[22] PCT Filed: May 11, 1990

[86] PCT No.: PCT/JP90/00602
§ 371 Date: Jan. 2, 1991
§ 102(e) Date: Jan. 2, 1991

[87] PCT Pub. No.: WO90/13858
PCT Pub. Date: Nov. 15, 1990

[30] Foreign Application Priority Data
May 12, 1989 [JP] Japan ................. 1-117519

[51] Int. Cl.$^5$ .................. G05D 3/12; G05B 13/04
[52] U.S. Cl. ............... 318/568.1; 318/568.11; 318/561; 318/615; 318/609
[58] Field of Search ............... 318/560–636, 318/800–818

[56] References Cited

U.S. PATENT DOCUMENTS

| | | | |
|---|---|---|---|
| 4,547,858 | 10/1985 | Horak | 318/568 X |
| 4,603,284 | 7/1986 | Perzley | 318/632 X |
| 4,639,652 | 1/1987 | Takahashi et al. | 318/568 |
| 4,680,518 | 7/1987 | Kurakake et al. | 318/561 |
| 4,695,780 | 9/1987 | Kurakake et al. | 318/561 X |
| 4,713,596 | 12/1987 | Bose | 318/561 X |
| 4,742,285 | 5/1988 | Sasaki et al. | 318/632 |
| 4,808,895 | 2/1989 | Fujita et al. | 318/384 |
| 4,816,734 | 3/1989 | Kurakake et al. | 318/615 |
| 4,851,754 | 7/1989 | Sakamoto et al. | 318/616 |
| 4,864,209 | 9/1989 | Seki et al. | 318/611 |
| 4,887,015 | 12/1989 | Kurakake et al. | 318/609 |
| 4,904,915 | 2/1990 | Kurakake | 318/568.22 |
| 4,943,759 | 7/1990 | Sakamoto et al. | 318/568.11 |
| 4,956,594 | 9/1990 | Mizuno et al. | 318/568.1 |
| 5,107,193 | 4/1992 | Iwashita | 318/560 |

*Primary Examiner*—Paul Ip
*Attorney, Agent, or Firm*—Staas & Halsey

[57] ABSTRACT

A sliding mode control method with a feedforward compensation function achieves a control response characteristic adapted to varying system parameters and properly maintains a manipulated variable affecting a controlled object. A position deviation ($\epsilon$), speed deviation ($\dot{\epsilon}$), predicted maximum and minimum inertias (Jmax, J0), predicted maximum and minimum gravity loads (GRmax, GRmin), switching variable (s), integral element ($\int(\dot{\epsilon}+C\cdot\epsilon)$), second differential ($\ddot{\theta}r$) of the command position, and actual speed ($\dot{\theta}$) are periodically calculated on the basis of a command position ($\theta r$), actual position ($\theta$), inertia data, and gravity load data (100–102, 104, 107, 110, 114, 117, 120, 123, 127). Even when a nonlinear system parameter such as inertia varies, a proper torque command (T) is periodically calculated, as a manipulated variable, on the basis of a switching amount (T1) obtained by adding together five terms calculated in accordance with respective positive or negative signs of the switching variable, position deviation, integral element, second differential, and actual speed (105, 106, 108, 109, 111–113, 115, 116, 118, 119, 121, 122, 124 to 126, 128–131).

2 Claims, 4 Drawing Sheets

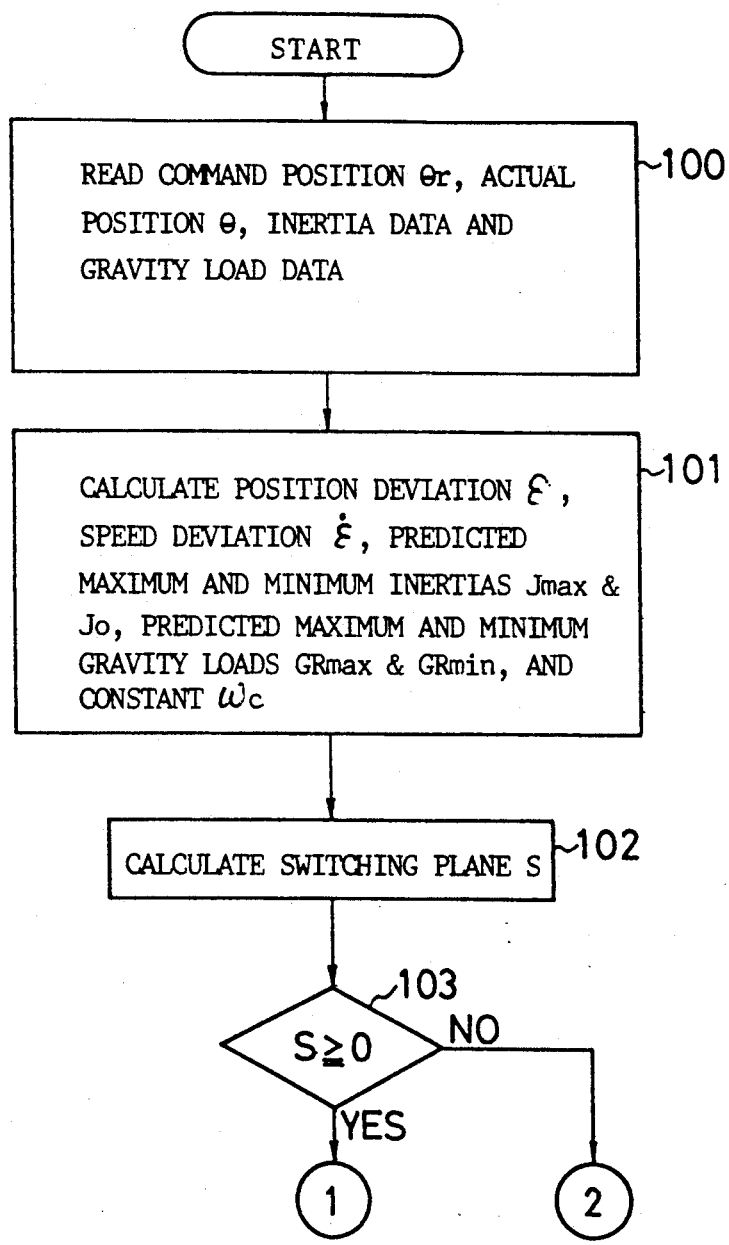

SLIDING MODE CONTROL METHOD WITH A FEEDFORWARD COMPENSATION FUNCTION

BACKGROUND OF THE INVENTION

1. Field of the Invention

The present invention relates to a sliding mode control method with a feedforward compensation function capable of achieving a control response characteristic adapted to varying system parameters, and more particularly, to a control method in which a manipulated variable affecting a controlled object can always be kept proper.

2. Description of the Related Art

A conventional control system for controlling the operation of a robot, machine tool, etc. is generally arranged to carry out proportional-plus-integral control using a fixed gain. In this case, if a system parameter greatly varies, the response characteristic of the control system is likely to become maladapted. In this respect, sliding mode control, etc. have recently been proposed. The conventional sliding mode control, however, entails a drawback such that a steady-state deviation from a control target value is likely to occur.

If the conventional sliding mode control is applied to a control system, which is provided with a feedforward compensation function for improvement of the control response characteristic, the manipulated variable (control input to a controlled object) is likely to become maladapted to the operating state of the controlled object, due to a compensation effect of a feedforward term associated with a nonlinear parameter (e.g., inertia, dynamical friction force, or gravitational term of the robot), when the nonlinear system parameter varies. If the manipulated variable is maladaptive, the controlled variable to be adjusted to a target value oscillates around the target value. In other words, an energy loss occurs in the controlled object. For example, the torque command (manipulated variable) supplied to the controlled object including a servomotor as a drive source oscillatorily varies with a change of the nonlinear parameter. Thus, a driving current flowing through the servomotor periodically becomes excessive, thereby heating the motor.

According to the conventional method neglecting a variation of the nonlinear system parameter in determining the manipulated variable as described above, the manipulated variable is likely to become maladaptive, causing inconveniences.

SUMMARY OF THE INVENTION

The object of the present invention is to provide a sliding mode control method with a feedforward compensation function, which is capable of achieving a control response characteristic adapted to varying system parameters, and of permitting a manipulated variable which affects a controlled object to be always kept proper.

In order to achieve the above object, an object is controlled using a sliding mode control method with a feedforward compensation function according to the present invention, comprising the steps of: selecting a value of an operation parameter representative of an operating state of a controlled object and a value of a nonlinear system parameter which varies in dependence on the operating state of the controlled object, respectively; calculating a manipulated variable which permits a characteristic of a control system to be converged on a switching plane in accordance with the selected values of the operation parameter and the nonlinear system parameter; and controlling the controlled object using the control system.

According to the present invention, as described above, when the sliding mode control with the feedforward compensation function is carried out, a manipulated variable which permits the characteristic of the control system to be converged on the switching plane is calculated in accordance with the detected value of the operation parameter, which represents the operating state of the controlled object, and the detected value of the nonlinear system parameter, which varies in dependence on the operating state of the controlled object. Accordingly, control stability achieved by the sliding mode control and control response characteristic achieved by the feedforward compensation function can be enjoyed. Moreover, it is possible to eliminate the maladaptation of the manipulated variable which would be otherwise likely to be caused due to the feedforward compensation effect associated with the nonlinear parameter when the nonlinear parameter varies. This makes it possible to reduce an energy loss in the controlled object.

BRIEF DESCRIPTION OF THE DRAWINGS

FIGS. 3A to 3C are flowcharts showing a sliding mode control process executed by the digital servo circuit shown in FIG. 2.

DESCRIPTION OF THE PREFERRED EMBODIMENT

Figure 1:
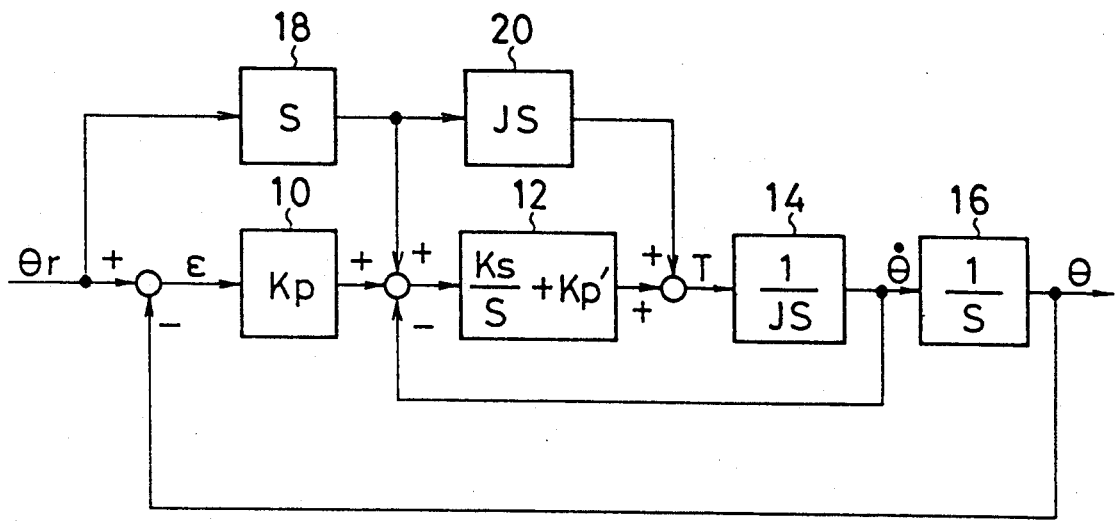
FIG. 1 is a block diagram showing a servomotor control system to which a sliding mode control method of an embodiment of the present invention is applied.

A control system to which a sliding mode control method according to an embodiment of the present invention is applied controls, e.g., a robot having a plurality of links, and comprises servomotor control systems which correspond in number to robot operating axes, one of which is shown in FIG. 1. The control system is arranged to control the drive of each link with respect to an associated one or more operating axes by means of one or more control systems associated therewith.

Referring to FIG. 1, each servomotor control system comprises a first transfer element 10 associated with a position control loop and having a proportional gain of Kp. In the transfer element 10, the difference (position deviation) $\epsilon$ between a command position $\theta r$ and an output from a fourth transfer element 16 representing an actual position $\theta$ is multiplied by the proportional gain Kp to produce a command speed, and the command position $\theta r$ is differentiated in a first feedforward term 18. A feedforward output is added to the difference (speed deviation) between the command speed and an actual speed $\dot{\theta}$, whereby a feedforward compensation for speed is effected. Then, a torque command corresponding to the sum of the speed deviation and the first feedforward term output is obtained in a second transfer element 12 associated with a speed loop for carrying out proportional-plus-integral control and having integral and differential gains of Ks and Kp', respectively. Further, the output of the first feedforward term 18 is differentiated in a second feedforward term 20, and also the product of the result of the differentiation and the inertia J of the link concerned is obtained. The output of the second feedforward term is added to the torque command from the second transfer element 12, whereby a feedforward compensation for acceleration is effected. A driving current corresponding to the compensated torque command (hereinafter referred to as torque command T) is supplied to a servomotor indicated by a third transfer element 14, such that the servomotor is rotated at the speed $\dot{\theta}$.

A sliding mode control method according to one embodiment of the present invention will now be described.

If the inertia, dynamical friction, and gravity load are considered as nonlinear system parameters, a relationship given by equation (1) is fulfilled in the control system of FIG. 1. Also, relationships given by equations (2) to (4) are fulfilled between the position deviation $\epsilon$, command position $\theta r$, and actual position $\theta$.

$$J \cdot \ddot{\theta} + A \cdot \dot{\theta} + GR = T \tag{1}$$

$$\epsilon = \theta r - \theta \tag{2}$$

$$\dot{\epsilon} = \dot{\theta} r - \dot{\theta} \tag{3}$$

$$\ddot{\epsilon} = \ddot{\theta} r - \ddot{\theta} \tag{4}$$

where A and GR represent a coefficient of dynamical friction and an equivalent torque (hereinafter referred to as gravity load) of the gravity load, respectively. Further, $\dot{\theta}$, $\dot{\theta}r$ and $\dot{\epsilon}$ represent first differentials of $\theta$, $\theta r$ and $\epsilon$, respectively, and $\ddot{\theta}$, $\ddot{\theta}r$ and $\ddot{\epsilon}$ represent second differentials of $\theta$, $\theta r$ and $\epsilon$, respectively.

If a switching variable (switching plane) s and a switching input (torque command) T for the sliding mode control are expressed by equations (5) and (6), respectively, a Liapunov function V (always positive and having its minimum at 0), associated with the switching variable s and given by equation (7), uniformly converges to 0, in other words, the characteristic of the servomotor control system converges on the switching plane (s=0) when the differential thereof $\dot{V}$ is negative.

$$s = \dot{\epsilon} + C \cdot \epsilon + D \cdot \int (\dot{\epsilon} + C \cdot \epsilon) \tag{5}$$

$$T = J0 \cdot \omega c \cdot \dot{\epsilon} + C \cdot J0 \cdot \omega c \cdot \epsilon + T1 \tag{6}$$

$$V = (\tfrac{1}{2}) \cdot s^2 \tag{7}$$

where C, D, and $\omega c$ individually represent constants, J0 represents the predicted minimum inertia of a controlled object (link), and T1 represents a switching amount (nonlinear input) described in detail later.

By substituting equation (9) obtained from equations (1), (4) and (6) into equation (8) which is obtained by differentiating both sides of equation (5), equation (10) is derived.

$$\dot{s} = \ddot{\epsilon} + (C + D) \cdot \dot{\epsilon} + C \cdot D \cdot \epsilon \tag{8}$$

$$\ddot{\epsilon} = \ddot{\theta} r + (A/J) \cdot \dot{\theta} + GR/J - (J0/J) \cdot \omega c \cdot \dot{\epsilon} - C \cdot (J0/J) \cdot \omega c \cdot \epsilon - T1/J \tag{9}$$

$$\dot{s} = (C + D - \omega c \cdot J0/J) \cdot \dot{\epsilon} - (C \cdot D - C \cdot \omega c \cdot J0/J) \cdot \epsilon - \tag{10}$$

-continued
$$T1/J + \ddot{\theta} r + (A/J) \cdot \dot{\theta} + GR/J$$

Then, by substituting equation (12) obtained from equations (5) and (10) into equation (11) which is obtained by differentiating both sides of equation (7), equation (13) indicating the differential $\dot{V}$ of the Liapunov function is obtained.

$$\dot{V} = s \cdot \dot{s} \tag{11}$$

$$\dot{s} = (C + D - \omega c \cdot J0/J) \cdot s - [C^2 \cdot \epsilon + (C \cdot D + D^2 - D \cdot \omega c \cdot J0/J) \cdot \int (\dot{\epsilon} + C \cdot \epsilon) + T1/J - \ddot{\theta} r - (A/J) \cdot \dot{\theta} - GR/J] \tag{12}$$

$$\dot{V} = (C + D - \omega c \cdot J0/J) \cdot s^2 - [C^2 \cdot \epsilon + (C \cdot D + D^2 - D \cdot \omega c \cdot J0/J) \cdot \int (\dot{\epsilon} + C \cdot \epsilon) + T1/J - \ddot{\theta} r - (A/J) \cdot \dot{\theta}] \cdot s \tag{13}$$

Then, a condition for the relationship $\dot{V}<0$ is obtained.

If the constant $\omega c$ is determined such that equation (14) is fulfilled, the first term of the right side of equation (13) is negative, as indicated by equation (15). In equation (14), symbol Jmax represents the predicted maximum inertia which varies depending on the operating state.

$$\omega c = (C+D) \cdot Jmax/J0 \tag{14}$$

First term of the right side of equation (13)

$$= C+D \cdot (1-Jmax/J) \cdot s^2 < 0 \tag{15}$$

In this case, if the sum of the second and third terms of equation (11) is negative, as indicated by equation (16), $\dot{V}<0$ is fulfilled.

$$-[C^2 \cdot \epsilon + (C \cdot D + D^2 - D \cdot \omega c \cdot J0/J) \cdot \int (\dot{\epsilon} + C \cdot \epsilon) + T1/J - \ddot{\theta} r - (A/J) \cdot \dot{\theta} - GR/J] \cdot s < 0 \tag{16}$$

Thus, in order to converge the characteristic of the servomotor control system switching plane (s=0) for the sliding mode control, thereby making the characteristic of the control system adapted to variations of the system parameters, it is necessary only that the switching amount T1 fulfilling equation (16) be calculated, the torque command T be calculated using the calculated switching amount T1 and in accordance with equation (6), and the servomotor be controlled by using the calculated torque command T.

According to the present embodiment, in determining the switching amount T1 which meets the condition for $\dot{V}<0$, the switching amount T1 is divided, as indicated by equation (17), in five; a first term K1 ($\epsilon$) given as a function of the position deviation $\epsilon$, a second term K2 ($\int(\dot{\epsilon}+C\cdot\epsilon)$) given as a function of an integral value $\int(\dot{\epsilon}+C\cdot\epsilon)$, a third term K3 ($\ddot{\theta}r$) associated with the feedforward compensation for acceleration and given as a function of the second differential $\ddot{\theta}r$ of the command position, a fourth term K4(GR) associated with gravity compensation and given as a function of the gravity load GR, and a fifth term K5($\dot{\theta}$) associated with dynamical friction compensation and given as a function of the actual speed $\dot{\theta}$.

$$T1 = K1(\epsilon) + K2(\int(\dot{\epsilon}+C\cdot\epsilon)) + K3(\ddot{\theta}r) + K4(GR) + K5(\dot{\theta}) \tag{17}$$

Further, the first term $K1(\epsilon)$ is calculated according to a calculation formula which is determined in dependence on the respective signs of the switching variable s and the position deviation $\epsilon$, and the second term $K2(\int(\dot{\epsilon}+C\cdot\epsilon))$ is calculated according to a calculation formula which is determined depending on the respective signs of the variable s and the integral value $\int(\dot{\epsilon}+C\cdot\epsilon)$. The third term $K3(\ddot{\theta}r)$ is calculated in accordance with a calculation formula which is determined depending on the respective signs of the switching variable s and the second differential $\ddot{\theta}r$ of the command position, and a fourth term $K4(GR)$ is calculated according to a calculation formula which is determined in dependence on the sign of the variable s, Further, the fifth term $K5(\dot{\theta})$ is calculated according to a calculation formula which is determined depending on the respective signs of the variable s and the actual speed $\dot{\theta}$.

More specifically, equation (16) holds if equation (18) holds when $s \geq 0$, or if equation (19) holds when $s < 0$.

$$T1 > -C^2 \cdot J \cdot \epsilon - \{J \cdot (C \cdot D + D^2) - D \cdot \omega c \cdot J0\} \cdot \int(\dot{\epsilon} + C \cdot \epsilon) - J \cdot \ddot{\theta}r - A \cdot \dot{\theta} - GR \quad (18)$$

$$T1 < -C^2 \cdot J \cdot \epsilon - \{J \cdot (C \cdot D + D^2) - D \cdot \omega c \cdot J0\} \cdot \int(\dot{\epsilon} + C \cdot \epsilon) - J \cdot \ddot{\theta}r - A \cdot \dot{\theta} - GR \quad (19)$$

Therefore, the first term $K(\epsilon)$ of the switching amount T1 is calculated using equation (20) when $s \geq 0$ and $\epsilon \geq 0$ or when $s < 0$ and $\epsilon < 0$, and using equation (21) when $s \geq 0$ and $\epsilon < 0$ or when $s < 0$ and $\epsilon \geq 0$.

$$K1(\epsilon) = -C^2 \cdot J0 \cdot \epsilon \quad (20)$$

$$K1(\epsilon) = -C^2 \cdot J\max \cdot \epsilon \quad (21)$$

Then, the second term $K2(\int(\dot{\epsilon}+C\cdot\epsilon))$ of the switching amount T1 is calculated using equation (22) when $s \geq 0$ and $\int(\dot{\epsilon}+C\cdot\epsilon) \geq 0$ or when $s < 0$ and $\epsilon < 0$, and using equation (23) when $s \geq 0$ and $\epsilon < 0$ or when $s < 0$ and $\int(\dot{\epsilon}+C\cdot\epsilon) \geq 0$.

$$K2(\int(\dot{\epsilon}+C\cdot\epsilon)) = -\{(C\cdot D+D^2)-D\cdot\omega c\}\cdot J0 \quad (22)$$

$$K2(\int(\dot{\epsilon}+C\cdot\epsilon)) = -\{(C\cdot D+D^2)\cdot J\max - D\cdot\omega c\cdot J0\} \quad (23)$$

Further, the third term $K3(\ddot{\theta}r)$ of the switching amount T1 is calculated using equation (24) when $s \geq 0$ and $\ddot{\theta}r \geq 0$ or when $s < 0$ and $\ddot{\theta}r < 0$, and using equation (25) when $s \geq 0$ and $\ddot{\theta}r < 0$ or when $s < 0$ and $\ddot{\theta} \geq 0$.

$$K3(\ddot{\theta}r) = J\max \cdot \ddot{\theta}r \quad (24)$$

$$K3(\ddot{\theta}r) = J0 \cdot \ddot{\theta}r \quad (25)$$

The fourth term $K4(GR)$ of the switching amount T1 is calculated using equation (26) when $s \geq 0$, and using equation (27) when $s < 0$.

$$K4(GR) = GR\max \quad (26)$$

$$K4(GR) = GR\min \quad (27)$$

where GRmax and GRmin respectively represent equivalent torques (hereinafter referred to as predicted maximum and minimum gravity loads) of the predicted maximum and minimum gravity loads which vary in dependence on the operating state of the robot.

Furthermore, the fifth term $K5(\dot{\theta})$ of the switching amount T1 is calculated using equation (28) when $s \geq 0$ and $\dot{\theta} \geq 0$ or when $s < 0$ and $\dot{\theta} < 0$, and using equation (29) when $s \geq 0$ and $\dot{\theta} < 0$ or when $s < 0$ and $74 \geq 0$.

$$K5(\dot{\theta}) = A\max \cdot \dot{\theta} \quad (28)$$

$$K5(\dot{\theta}) = A\min \cdot \dot{\theta} \quad (29)$$

where Amax and Amin represent the maximum and minimum coefficients of dynamical friction, respectively.

Then, the switching amount T1 fulfilling the condition for $\dot{V} < 0$ is obtained by adding together the first to fifth terms $K1(\epsilon)$ to $K5(\dot{\theta})$ calculated individually in the aforesaid manner, the torque command T which can make the characteristic of the servomotor control system adapted to the variations of the system parameters including the nonlinear parameters is calculated in accordance with equation (6) using the calculated switching amount T1, and the motor is operated in accordance with the calculated torque command T. In this case, the Liapunov stability condition ($\dot{V} < 0$) is fulfilled, whereby the characteristic of the servomotor control system of FIG. 1 converges on the switching flave (s=0), and the response characteristic of the control system is determined in accordance with the switching plane. In other words, the stability of the control system can be maintained even if a nonlinear system parameter, e.g., the inertia J, greatly varies. Further, since the switching variable s contains an integral element, a steady-state deviation from the control target can be reduced to 0. In some case, the inertia J in a workpiece-held state is about six times as large as that in a workpiece-released state.

Figure 2:
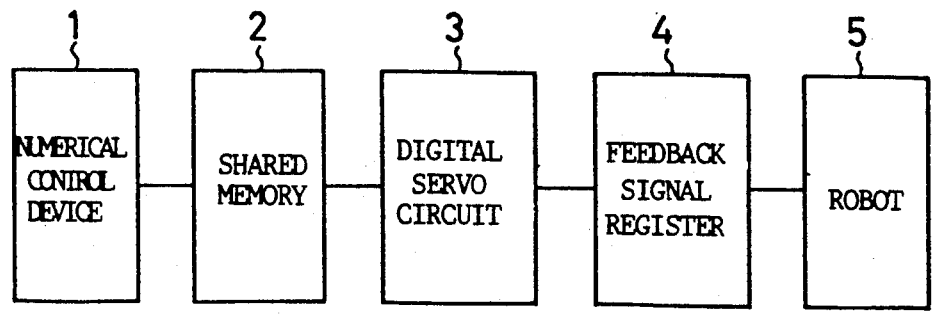
FIG. 2 is a schematic block diagram illustrating, by way of example, a digital servo control system for embodying the sliding mode control method of the present invention.

Referring now to FIG. 2, a digital servo (software servo) control system, corresponding to the servomotor control system shown in FIG. 1, for embodying the aforementioned sliding mode control method will be described.

This control system comprises a digital servo circuit 3 which contains a digital signal processor (not shown) and a memory for storing setting values of various constants mentioned later. The digital servo circuit 3 is arranged to execute position, speed and current control of the servomotors for the individual axes (not shown, corresponding to the third transfer element 14 in FIG. 1) of the robot 5 by software processing. In other words, the servo control system illustrated in FIG. 2 comprises a position control loop, a speed control loop, and a current control loop.

Further, the servo control system comprises a shared memory 2 formed by a RAM which is accessible from both the processor (hereinafter referred to as the first processor) of the digital servo circuit 3 and a processor (not shown, hereinafter referred to as the second processor) of a host computer, e.g., a numerical control device 1 for distributing movement commands, current detectors (not shown) for detecting the actual driving currents flowing through the servomotors, and servo amplifiers (not shown) for driving the servomotors of the individual axes in accordance with current commands from the digital servo circuit 3 and outputs from the current detectors. Furthermore, the control system comprises pulse coders (not shown) attached respectively to the servomotors and corresponding to the fourth transfer element 16 in FIG. 1, a feedback signal register 4 for storing the results of detection by the pulse coders and the current detectors under the control of the processor, and a manual data input device (not shown) for inputting various constants.

Figure 3B:
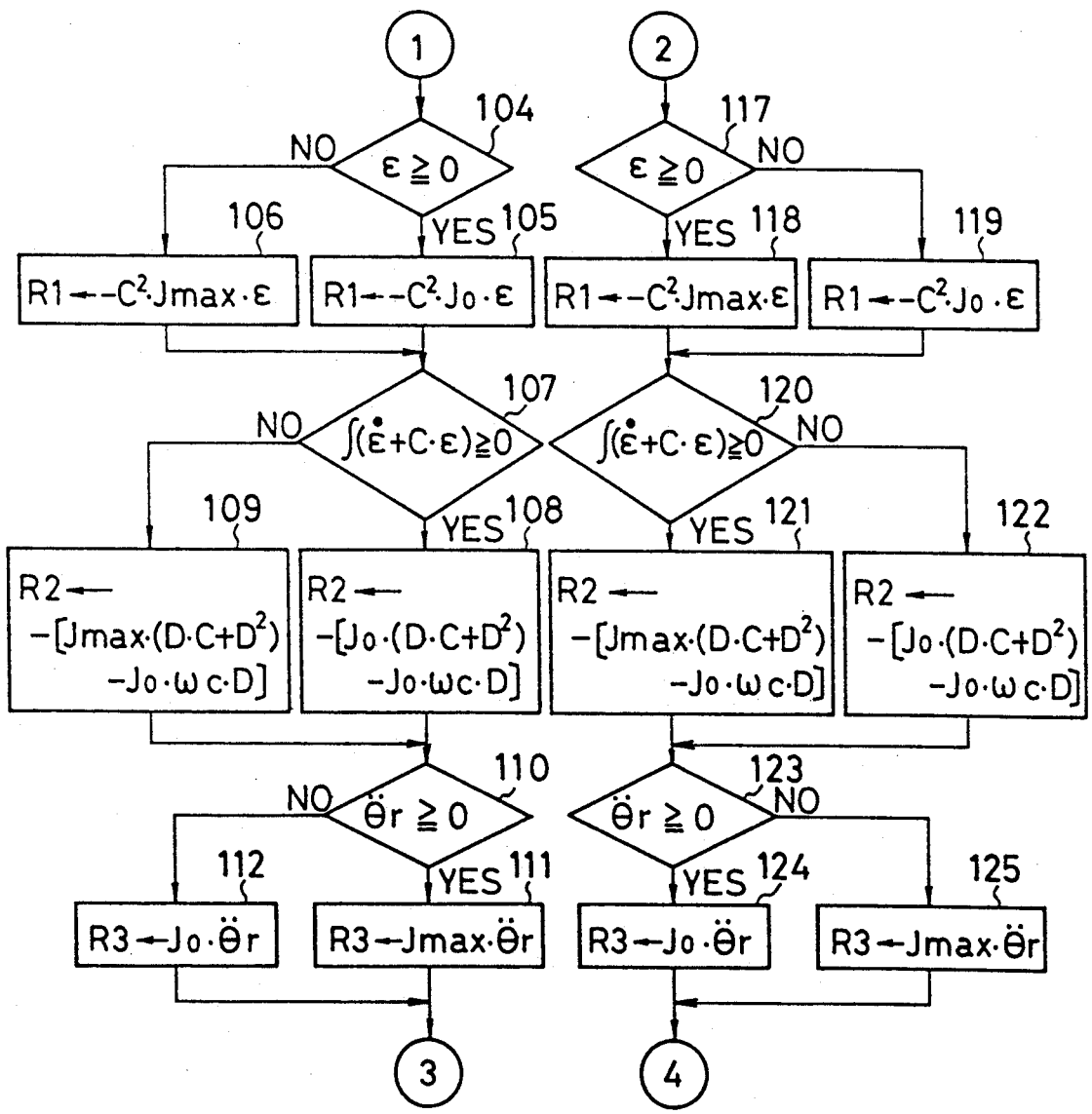
Figure 3C:
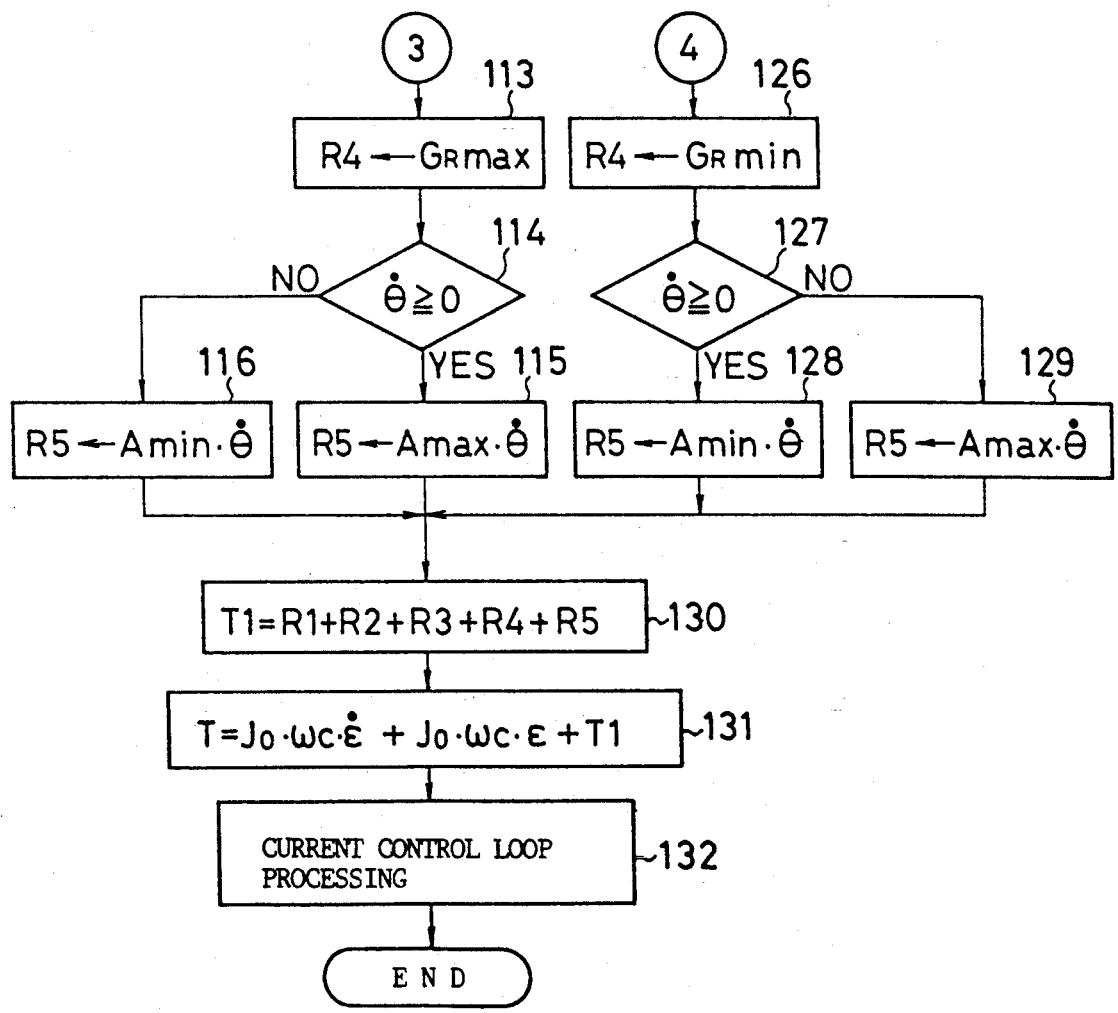

Referring now to FIG. 3, (formed of FIGS. 3A-3C), the operation of the servo control system of FIG. 2 will be described.

Before operating the robot, the respective setting values of the aforementioned constants C, D and the maximum and minimum dynamical friction coefficients Amax and Amin are input individually through the manual data input device. Also, coefficients M1, M2, N1 and N2 (not shown) used individually for the calculation (mentioned later) of the predicted maximum and minimum inertias Jmax and J0 and the predicted maximum and minimum gravity loads GRmax and GRmin, respectively, are manually input. The coefficients M1 and M2 are set, for example, to "1.2" and "0.8," respectively. The aforesaid various setting values are stored in the built-in memory in the digital servo circuit 3 of the servo control system. Instead of the manual inputting mentioned above, the setting values of the constants and the dynamical friction coefficients may be previously described in a program for robot control, for example.

During an operation of the robot, the first processor executes the sliding mode control process shown in FIG. 3 at intervals of the same period as the execution period for the movement command distribution by the second processor.

More specifically, in each control period, the first processor reads out from the shared RAM 2 the command position $\theta r$, which is written in the shared RAM 2 by the second processor at intervals of the movement command distribution period, and inertia data and gravity load data, which are written at suitable timing in the shared RAM 2 by the second processor, and also reads out the actual position $\theta$ from the feedback signal register 4 (Step 100). Then, the first processor calculates the position deviation $\epsilon$ ($\theta r - \epsilon$), speed deviation $\dot{\epsilon}$, predicted maximum and minimum inertias Jmax and J0, predicted maximum and minimum gravity loads GRmax and GRmin, and constant $\omega c$, and causes various registers accommodated therein to store the calculated values, respectively (Step 101). The coefficients M1, M2, N1 and N2 are used for the calculation of the values Jmax, J0, Gmax and Gmin.

Subsequently, the first processor calculates the value of the switching variable s in accordance with equation (5) (Step 102), and determines whether or not the calculated value s is positive or "0" (Step 103). If $s \geq 0$, the first processor determines whether or not the position deviation $\epsilon$ is "0" or positive (Step 104). If $\epsilon \geq 0$, the processor calculates the first term K1($\epsilon$) of the switching amount T1 in accordance with equation (20), and stores the calculated value in a register R1 contained in the first processor (Step 105). On the other hand, if the result of the determination in Step 104 is negative ($\epsilon < 0$), the processor calculates the value K1($\epsilon$) in accordance with equation (21), and stores the calculated value in the register R1 (Step 106).

In Step 107 following Step 105 or 106, the first processor calculates the integral value $\int(\dot{\epsilon}+C\cdot\epsilon)$ associated with the switching amount T1, and determines whether or not the calculated value is "0" or positive. If the result of the determination in Step 107 is affirmative ($\int(\dot{\epsilon}+C\cdot\epsilon) \geq 0$), the value of the second term K2($\int(\dot{\epsilon}+C\cdot\epsilon)$) of the switching amount T1 is calculated in accordance with equation (22), and the result is stored in a register R2 contained in the first processor (Step 108). If the result of the determination in Step 107 is negative, the value of the second term K2 ($\int(\dot{\epsilon}+C\cdot\epsilon)$) is calculated in accordance with equation (23), and the calculated value is stored in the register R2 (Step 109).

In Step 110 following Step 108 or 109, the first processor calculates the second differential $\ddot{\theta}r$ of the command position. At this time, the first processor calculates the difference between the command position $\theta r$ for the preceding processing period and that for the present processing period, as the first differential $\dot{\theta}r$ of the command position, and then calculates, as the second differential $\ddot{\theta}r$, the difference between the first differential thus calculated and the first differential obtained in a similar manner in the preceding processing period. Further, the first processor determines whether or not the second differential $\ddot{\theta}r$ is positive or "0" (Step 110). If the result of the determination is affirmative ($\ddot{\theta}r \geq 0$), the first processor calculates the value of the third term K3 ($\ddot{\theta}r$) of the switching amount T1 in accordance with equation (24), and stores the result in a built-in register R3 (Step 111). On the other hand, if the result of the determination in Step 110 is negative ($\ddot{\theta}r < 0$), the first processor stores the value of the third term, calculated in accordance with equation (25), in the register R3 (Step 112). In Step 113 following Step 111 or 112, the first processor stores the predicted maximum gravity load GRmax calculated in Step 101 in a built-in register R4, and then determines whether or not the actual speed $\dot{\theta}$ is positive or "0" (Step 114). If the result of the determination is affirmative ($\dot{\theta} \geq 0$), the value of the fifth term K5($\dot{\theta}$) of the switching amount T1 is calculated in accordance with equation (28), using the maximum dynamical friction coefficient Amax manually set before the robot is started, and the calculated value is stored in a built-in register R5 (Step 115). If $\dot{\theta} < 0$, on the other hand, the value K5($\dot{\theta}$) calculated in accordance with equation (29) and using the minimum dynamical friction coefficient Amin is stored in the register R5 (Step 116).

If the result of the determination in Step 103 is negative ($s < 0$), the first processor calculates the value K1($\epsilon$) in accordance with equation (20) or (21), depending on the result of the determination in Step 117 corresponding to Step 104, namely, depending on whether the position deviation $\epsilon$ is positive or negative, and stores the result in the register R1 (Step 118, 119). Then, the value K2($\int(\dot{\epsilon}+C\cdot\epsilon)$) which is calculated in accordance with equation (22) or (23), depending on the result of the determination in Step 120, i.e., depending on whether the integral value $\int(\dot{\epsilon}+C\cdot\epsilon)$ is positive or negative, is stored in the register R2 (Step 121, 122). Further, the value K3($\ddot{\theta}r$) which is calculated in accordance with equation (24) or (25), depending on the result of the determination in Step 123, i.e., depending on whether $\ddot{\theta}r$ is positive or negative, is stored in the register R3 (Step 124, 125), and the predicted minimum gravity load GRmin calculated in Step 101 is stored in the register R4 (Step 126). Then, the value K5($\dot{\theta}$) which is calculated in accordance with equation (28) or (29), depending on the result of the determination in Step 127, namely, depending on whether $\dot{\theta}$ is positive or negative, is stored in the register R5 (Step 128, 129).

In Step 130 following Step 115, 116, 128 or 129, the first processor adds together the respective values of the first to fifth terms of the switching amount T1 read out individually from the registers R1 to R5, thereby obtaining the switching amount T1 (K1($\epsilon$)+K2($\int(\dot{\epsilon}+C\cdot\epsilon)$)+K3($\ddot{\theta}r$)+K4(GR)+K5($\dot{\theta}$)), and also calculates the torque command T in accordance with equation (6) (Step 131). Based on the calculated torque command T and the current detector outputs representing the actual servomotor driving currents, the first processor executes the current control loop processing, and sends the resulting current command to the servo amplifiers (Step 132). The servo amplifiers supply the servomotors of corresponding axes with driving currents corresponding to the current commands from the digital servo circuit 3, to thereby drive the motors. For the reasons mentioned above, no steady-state deviation occurs in the digital servo system during operation of the robot, and a proper manipulated variable (torque command T) can be produced even if one or more nonlinear system parameters greatly vary.

We claim:

1. A sliding mode control method with a feedforward compensation function for controlling a controlled object, comprising the steps of:
   (a) obtaining position deviation and speed deviation values of an operation parameter representative of an operating state of the controlled object and gravitational and inertial values, corresponding thereto, of a nonlinear system parameter, which vary in dependence on the operating state of the controlled object, said obtaining including the steps of:
      (a1) periodically detecting a command position in a command from a host processor and an actual position in feedback from a position detector;
      (a2) receiving inertia data and gravity load data as the inertial and gravitational values of nonlinear system parameters; and
      (a3) periodically calculating the position deviation and the speed deviation values in dependence upon the command and actual positions;
   (b) calculating a value for a manipulated variable to converge a characteristic of a control system on a switching plane in accordance with the position and speed deviation values of the operation parameter and the gravitational and inertial values of the nonlinear system parameter, said calculating including the steps of:
      (b1) periodically calculating a predicted maximum inertia, a predicted minimum inertia, a predicted maximum gravity load, and a predicted minimum gravity load, in dependence upon the command position, the actual position, the inertia data, and the gravity load data detected in step (a); and
      (b2) periodically calculating the manipulated variable in dependence upon the position deviation, the speed deviation, the predicted maximum inertia, the predicted minimum inertia, the predicted maximum gravity load, and the predicted minimum gravity load calculated in step (b1); and
   (c) controlling operation of the controlled object in dependence upon the manipulated variable.

2. A sliding mode control method with a feedforward compensation function according to claim 1,
   further comprising the step of (d) defining calculating of a switching variable including an integral element before execution of said obtaining in step (a);
   wherein said calculating in step (b2) includes the steps of:
      (b2A) calculating a value of the switching variable based on a value of the integral element of the switching variable, in dependence upon the calculated position deviation and the calculated speed deviation;
      (b2B) calculating a second differential value of the command position in dependence upon the detected command position; and
      (b2C) calculating the manipulated variable in according with positive and negative signs of the calculated value of the switching variable, the calculated value of the integral element, the calculated value of the second differential of the command position, and the calculated position deviation.

* * * * *